US006443266B2

(12) United States Patent
Murakami et al.

(10) Patent No.: US 6,443,266 B2
(45) **Date of Patent: *Sep. 3, 2002**

(54) TRACTION TYPE ELEVATOR

(75) Inventors: Shin Murakami, Tokyo; Yasuyuki Wagatsuma; Tadashi Shudo, both of Saitama-ken, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/387,769

(22) Filed: Sep. 1, 1999

(30) Foreign Application Priority Data

Sep. 1, 1998 (JP) ........................................ 10-247386

(51) Int. Cl.$^{7}$ ........................ B60G 25/00; B66B 7/08; F16F 3/08

(52) U.S. Cl. ................................................ 187/401

(58) Field of Search ............................ 187/266, 292, 187/343, 401, 411, 345, 414

(56) References Cited

U.S. PATENT DOCUMENTS

| | | | | | |
|---|---|---|---|---|---|
| 4,113,064 | A | * | 9/1978 | Shigeta et al. | 187/414 |
| 4,899,852 | A | * | 2/1990 | Salmon et al. | 187/411 |
| 4,977,980 | A | * | 12/1990 | Hifumi | 187/401 |
| 5,005,671 | A | * | 4/1991 | Aime et al. | 187/411 |
| 5,020,639 | A | * | 6/1991 | Michel | 187/401 |
| 5,027,925 | A | * | 7/1991 | Kahkipuro | 187/292 |
| 5,080,201 | A | * | 1/1992 | Yoo et al. | 187/411 |
| 5,301,773 | A | * | 4/1994 | Jamieson et al. | 187/376 |
| 5,306,879 | A | * | 4/1994 | Pearson | 187/401 |
| 5,325,937 | A | * | 7/1994 | Suchodolski et al. | 187/401 |
| 5,402,861 | A | * | 4/1995 | Kohara | 187/292 |
| 5,429,211 | A | * | 7/1995 | Aulanko et al. | 187/254 |
| 5,443,140 | A | * | 8/1995 | Nagel et al. | 187/253 |
| 5,490,577 | A | * | 2/1996 | Yoo | 187/266 |
| 5,501,300 | A | * | 3/1996 | Cho | 187/289 |
| 5,613,667 | A | * | 3/1997 | Ho | 267/141.1 |
| 5,862,888 | A | * | 1/1999 | Iwakiri et al. | 187/411 |
| 5,896,949 | A | * | 4/1999 | Hamdy et al. | 187/292 |
| 5,899,300 | A | * | 5/1999 | Miller et al. | 187/266 |
| 5,899,301 | A | * | 5/1999 | Aulanko et al. | 187/266 |

FOREIGN PATENT DOCUMENTS

| | | | | |
|---|---|---|---|---|
| EP | 000350582 | * | 1/1990 | 187/401 |
| FR | 2 647 097 | | 11/1990 | |
| GB | 2 306 440 | | 5/1997 | |
| JP | 401256486 | * | 10/1980 | 187/401 |
| JP | 401156293 | * | 6/1989 | 187/401 |
| JP | 402095693 | * | 4/1990 | 187/401 |
| JP | 403003888 | * | 1/1991 | 187/401 |
| JP | 403051280 | * | 3/1991 | 187/401 |
| JP | 404491191 | * | 2/1992 | 187/401 |
| JP | 404112178 | * | 4/1992 | 187/401 |
| JP | 404144891 | * | 5/1992 | 187/401 |
| JP | 404213585 | * | 8/1992 | 187/401 |
| JP | 404303380 | * | 10/1992 | 187/401 |
| JP | 406080342 | * | 3/1994 | 187/414 |
| JP | 406135661 | * | 5/1994 | 187/401 |
| JP | 7-10421 | | 1/1995 | |

* cited by examiner

*Primary Examiner*—Kathy Matecki
*Assistant Examiner*—Paul T. Chin
(74) *Attorney, Agent, or Firm*—Oblon, Spivak, McClelland, Maier & Neustadt, P.C.

(57) ABSTRACT

An elevator including a cage configured to move up and down in a shaft along a guide rail, a plurality of car sheaves installed at a bottom of the cage, a cable placed around the car sheaves and configured to suspend the cage, a hoisting machine having a traction sheave configured to drive the cable, a base extending in a width direction of the cage and configured to support the car sheaves, and a first elastic member disposed between the cage and the base so as to attenuate vibration transferred to the cage.

9 Claims, 11 Drawing Sheets

TRACTION TYPE ELEVATOR

CROSS REFERENCE TO RELATED APPLICATION

This application claims benefit of priority to Japanese Patent Application No. JP-10247386 filed Sep. 1, 1998, the entire disclosure of which is incorporated by reference herein.

BACKGROUND OF THE INVENTION

1. Field of the Invention

The present invention relates to a traction type elevator having a cage suspended by cables placed around car sheaves.

2. Description of the Background

FIG. 1 is a front view of one example of a traction type elevator, and FIG. 2 is a perspective view of an elevator cage shown in FIG. 1.

In FIG. 1 and FIG. 2, opposite ends of a cable 82 are secured to the upper part of a shaft 83. The cable 82 is placed around a traction sheave 85 driven by a hoisting machine 84 having a motor (not shown). A cage 80 for accommodating passengers and a counter weight 86 for balancing the cage 80 are suspended by the cable 82 through a weight sheave 87 and car sheaves 81 of the cage 80.

In this type of elevator, the cable 82 and the traction sheave 85 are located within the space between the cage 80 and a shaft wall 88. Therefore, if the hoisting machine 84 driving the traction sheave 85 is located within the space between the cage 80 and the shaft wall 88, the cage 80 can move up and down without expanding the size of the shaft 83.

In general, when the cage 80 stops at a floor in order to let passengers on and off the cage 80, the traction sheave 85 is locked by a brake (not shown) so as not to rotate. After passengers get on and off, at the time the cage 80 starts to move, the brake is off. The weight of the counter weight 86 is designed approximately half of the maximum permissible load of the cage 80. That is, if the maximum permissible load of the cage 80 is 1,000 lbs, the weight of the counter weight 86 is 500 tbs. When passengers weighing a half of the maximum permissible load board the cage 80, the cage 80 and the counter weight 86 are nearly balanced. Accordingly, if the upward bound cage 80 is filled with passengers at a floor, at the moment the brake is turned off in order to move the cage 80 upwardly, the cage 80 moves downwardly for a moment and then moves up as requested. On the contrary, if the downward bound cage 80 has no passengers at a floor, at the moment the brake is turned off in order to move the cage 80, the cage 80 moves upwardly for a moment and then moves down in the right direction. To prevent the above unexpected sudden movement of the cage 80, the motor of the traction sheave 85 is provided with a necessary torque according to a load of the cage 80 before the brake is turned off. The load of the cage 80 is detected by a load sensor. In conventional elevators, the cage has a "double" type construction in which the cage is composed of a cab for accommodating passengers and an outer frame supporting the cab through a rubber elastic member (see JP 10-119495), and the load detector is installed between the cab and the cage frame in order to detect the deformation of the rubber elastic member. Then the load of the cage 80 is calculated on the basis of the deformation of the rubber elastic member.

However, in the above mentioned elevator, since the car sheaves 81 near the cage 80 rotate fast in contact with the cable 82, vibration and noise can be transferred to the cage 80 easily.

Further, vibration caused by a tension change of the cable 82 around the hoisting machine 84 can be transferred to the cage 80 via the car sheaves 81.

To attenuate vibration and noise in the conventional elevator cage having the "double" construction as mentioned above, and elastic rubber members are installed between the cab and the cage frame. But this makes the cage 80 heavier and complicates the structure of the cage 80.

SUMMARY OF THE INVENTION

Accordingly, one object of the invention is to provide an elevator suspended by a cable through car sheaves, which can improve comfort of a ride in the cage without using the "double" construction in which the cage is surrounded and supported by an exterior frame.

This and other objects are achieved according to the present invention by providing a new and improved elevator including a cage configured to move up and down in a shaft along a guide rail, a plurality of car sheaves installed at a bottom of the cage, a cable placed around the car sheaves and configured to suspend the cage, a hoisting machine having a traction sheave configured to drive the cable, a base extending in a width direction of the cage and configured to support the car sheaves, and a first elastic member lying between the cage and the base.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 3:
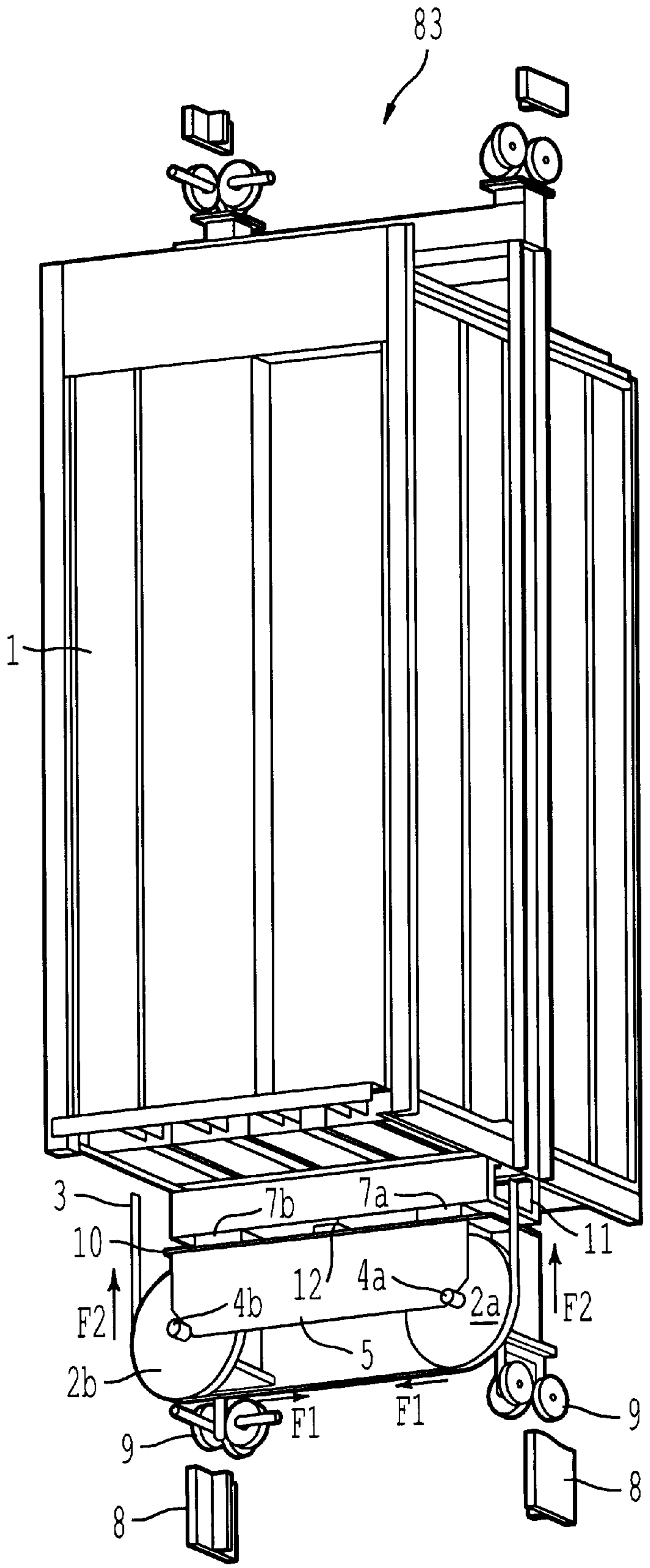
FIG. 3 is a perspective view of an elevator cage of a first embodiment of the present invention.
Figure 4:
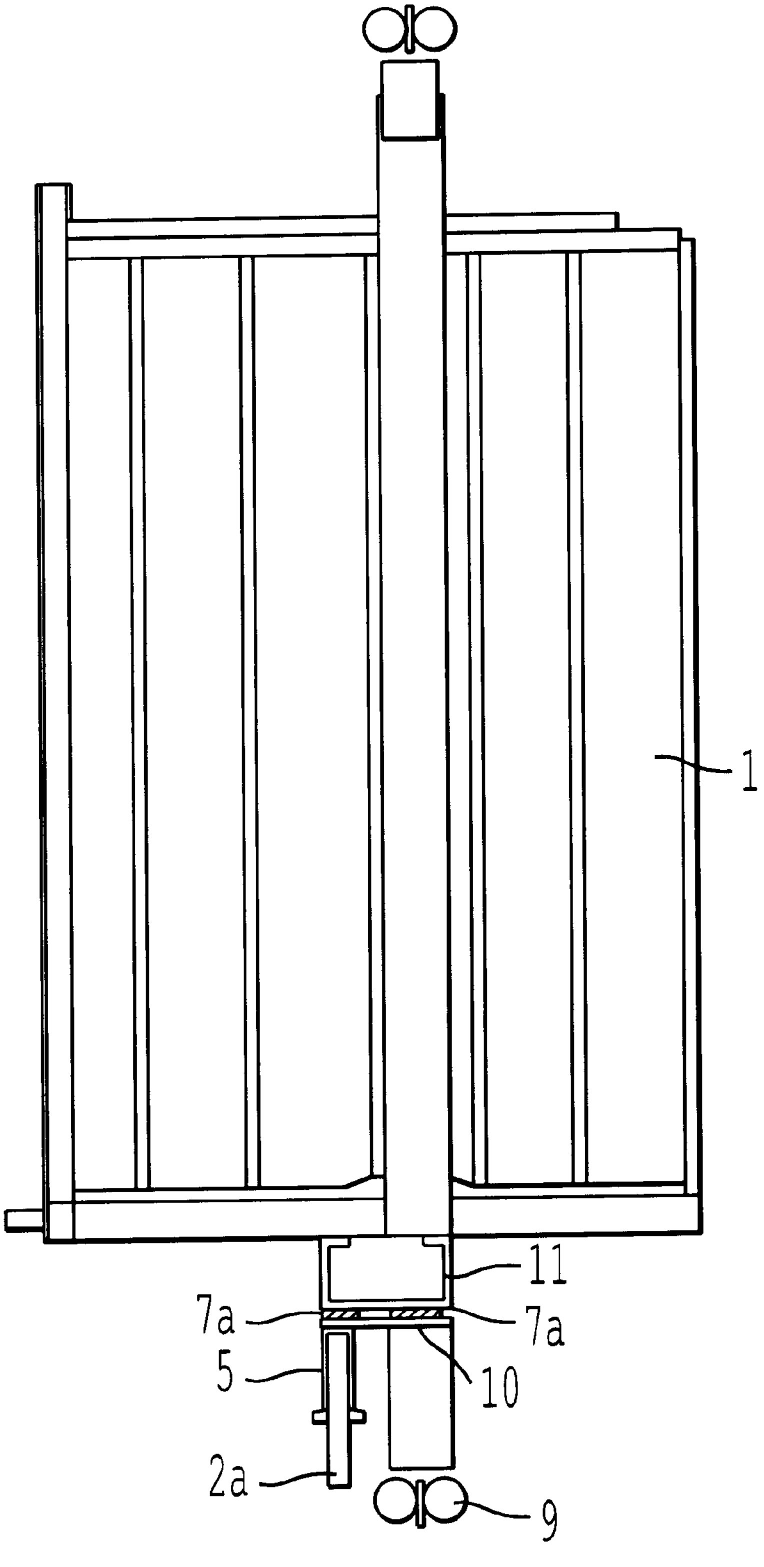
FIG. 4 is a side view of the elevator cage shown in FIG. 3.
Figure 5:
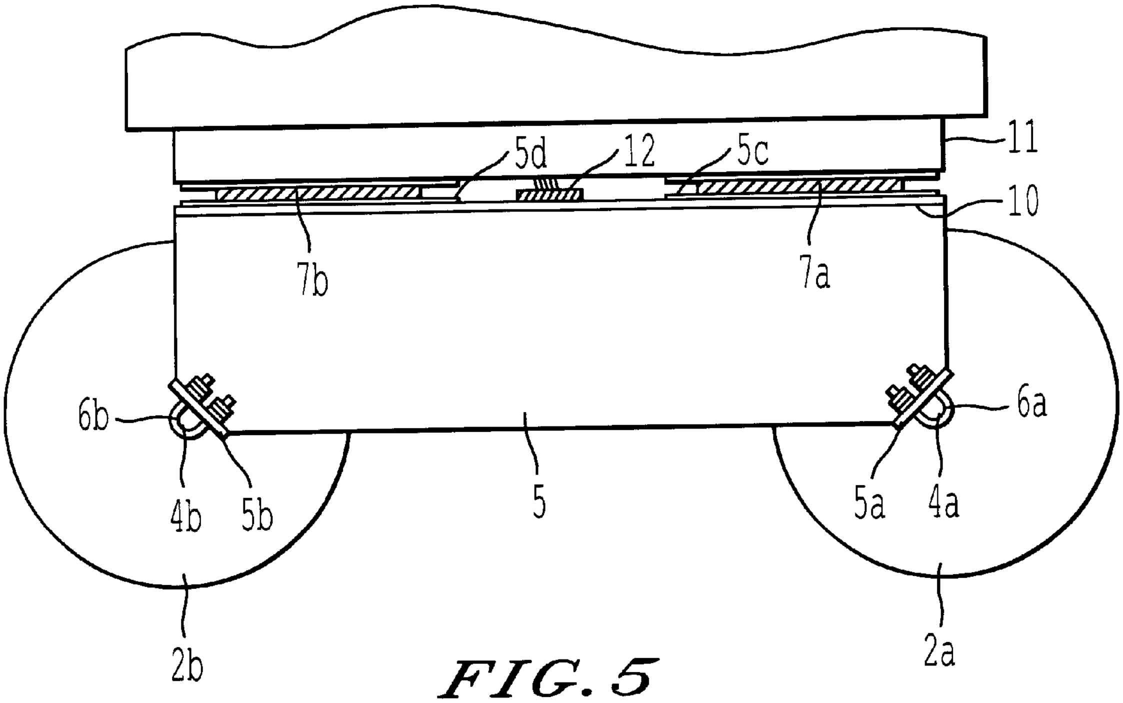
FIG. 5 is a partial side view of the elevator cage shown in FIG. 3.

Referring now to the drawings, wherein like reference numerals designate the same or corresponding parts throughout the several views, and more particularly referring to FIGS. 3–5 thereof, a first embodiment of the invention is next described.

Figure 1:
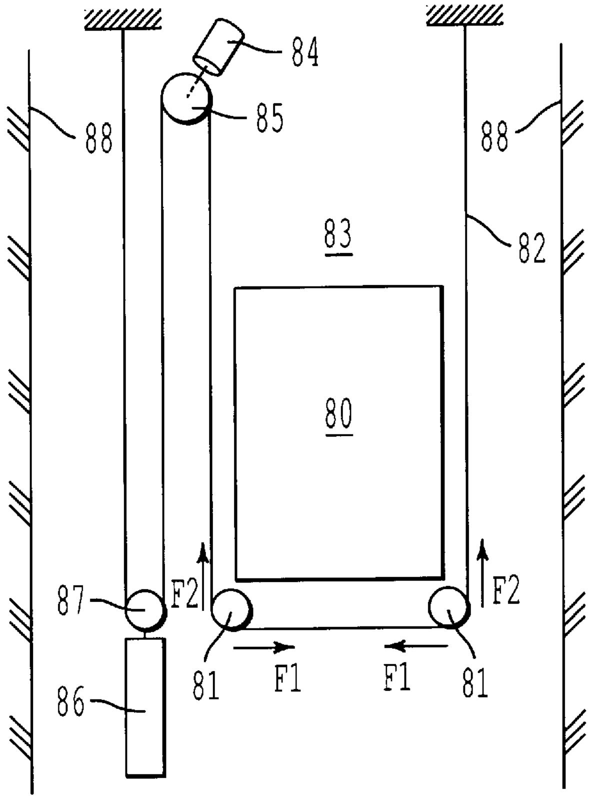
FIG. 1 PRIOR ART
FIG. 1 is a front view of a conventional traction type elevator.
Figure 2:
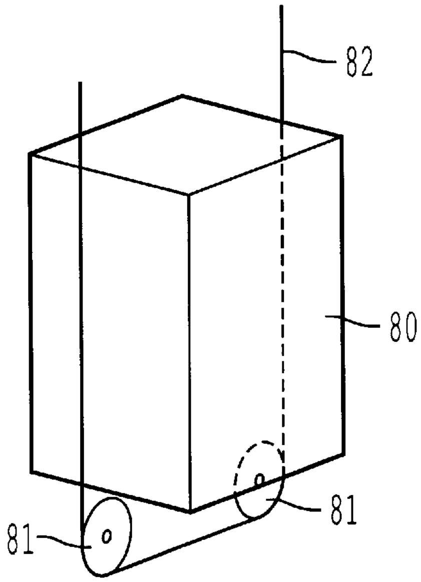
FIG. 2 PRIOR ART
FIG. 2 is a perspective view of an elevator cage shown in FIG. 1.

In the first embodiment, the structure for moving the elevator up and down is generally the same as that shown in FIG. 1. That is, both ends of a cable 3 are secured to the upper part of a shaft 83. The cable 3 is placed around a traction sheave 85 in FIG. 1 driven by a hoisting machine 84 having a motor (not shown). A cage 1, shown in FIG. 3, for accommodating passengers and a counter weight 86 shown in FIG. 1 for balancing the cage 1 are suspended by the cable 3 through a weight sheave 87 of the counter weight 86 and car sheaves 2*a* and 2*b* of the cage 1.

As shown in FIGS. 3–5, a pair of car sheaves 2*a* and 2*b* is installed at the bottom of the cage 1. The cable 3 is placed around the car sheaves 2*a* and 2*b*. As with the conventional elevator of FIG. 1, one end of the cable 3 is secured to the ceiling part of the shaft 83, and the other end of the cable 3 is secured to the ceiling part of the shaft 83 through the traction sheave 85 and the weight sheave 87. The car sheaves 2*a* and 2*b* are rotatably attached to respective axles 4*a* and 4*b* through respective bearings (not shown). The axles 4*a* and 4*b* are secured to both edges of a support base 5 extending in the width direction of the cage 1. As shown in FIG. 4, the support base 5 is U-shaped with opposed members facing opposite sides of the car sheaves 2*a* and 2*b*. A support plate 10 is provided on the upper side of the support base 5. Further, two lower roller guides 9 are attached to the support plate 10 near opposed edges of the support base 5, and the roller guides 9 guide the cage 1 along a pair of guide rails 8 installed on a wall of the shaft 83. Each of the lower roller guides 9 is composed of three rollers which engage the opposed sides and end of the appended center member of the guide rail 8. A guide shoe having no rollers sliding along the guide rail 83 can be substituted for the lower roller guides 9. Furthermore, as shown in FIG. 5, slant planes 5*a* and 5*b* inclined by at an approximately 45° angle formed at opposite edges of the support base 5, and axles 4*a* and 4*b* are secured on the slant planes 5*a* and 5*b* by U-shaped bolts 6*a* and 6*b*. The angle of slant planes 5*a*, 5*b* depends on the direction of a resultant force of a tension F1 and a tension F2. That is, the angle of slant planes 5*a* and 5*b* is designed to be perpendicular to the resultant force so that the U-shaped bolts 6*a* and 6*b* can avoid receiving a shear force. Plates 5*c* and 5*d* are disposed on the upper side of the support plate 10, and rubber plates 7*a* and 7*b* are disposed on the plates 5*c* and 5*d*. A base 11 made of a bent metal plate is secured to the bottom of the cage 1, and the support base 5 is attached to the base 11 through rubber plates 7*a* and 7*b*. A deformation sensor 12 is installed between the support base 5 and the base 11 so as to detect the deformation of the rubber plates 7*a* and 7*b*. The signal of the deformation of the rubber plates 7*a* and 7*b* from the deformation sensor 12 is transmitted to a controller (not shown) for an elevator, and the controller calculates a load of the cage 1.

According to the first embodiment, vibration caused by a contact point between the cable 3 and the car sheaves 2*a* and 2*b*, and vibration caused by a tension change of the cable 3 are transferred to the cage 1. A tension F1 between the car sheaves 2*a* and 2*b* applies to the support base 5 as a compressive force. Consequently, the rubber plates 7*a* and 7*b* hardly receive a shearing force, a tensile force and a bending force, which might be caused by the tension F1. The rubber plates 7*a* and 7*b* basically receive only compressive force.

Further, since the axles 4*a* and 4*b* of the car sheaves 2*a* and 2*b* are supported on the slant planes 5*a* and 5*b* with an angle of 45°, that is to say, since the angle of slant planes 5*a* and 5*b* is designed to be perpendicular to a resultant force of the tension F1 and the tension F2, the resultant force is basically applied to the slant planes 5*a* and 5*b*. Thus, the U-shaped bolts 6*a* and 6*b* can avoid receiving a shear force caused by tensions F1 and F2.

Furthermore, since the support plate 10 extends in the axles direction of the car sheaves 2*a* and 2*b*, a bending moment applied to the car sheaves 2*a* and 2*b* can be received by the support plate 10. Therefore, although the car sheaves 2*a* and 2*b* are attached to the cage 1 through the rubber plates 7*a* and 7*b*, the car sheaves 2*a* and 2*b* can avoid being inclined by the bending moment.

Moreover, since the lower roller guides 9 are attached to the support plate 10 disposed on the support base 5, vibration transferred from the lower roller guides 9 can be attenuated by the rubber plates 7*a* and 7*b*.

Furthermore, the lower guides 9 can be directly secured to the cage 1 without being supported by the rubber plates 7*a* and 7*b*. In this case, although vibration transferred from the lower guides 9 can not be attenuated efficiently, the lower roller guides 9 can guide the cage 1 effectively.

In the first embodiment, since a load of the cage 1 is calculated on the basis of a deformation of the rubber plates 7*a* and 7*b* detected by the deformation sensor 12, a necessary torque based on the load of the cage 1 is provided for a motor driving the traction sheave 85 before a brake of the traction sheave 85 is turned off. Therefore, an unexpected sudden movement of the cage 1 can be prevented at the time the brake is turned off.

Accordingly, since vibration caused by contact points between the cable 3 and the car sheaves 2*a* and 2*b* is attenuated by the rubber plates 7*a* and 7*b*, and then the attenuated vibration is transferred to the cage 1, the comfort of a ride in the cage 1 can be improved. Further, since the rubber plates 7*a* and 7*b* basically receive only compressive force via the support base 5, the support structure of the car sheaves 2*a* and 2*b* can be simplified. Similarly, since the slant planes 5*a* and 5*b* of the support plate 5 basically receive only compressive forces from the axles 4*a* and 4*b*, the support structure of the axles 4*a* and 4*b* can be simplified. Eventually, the cage 1 need not be encased in an outer frame, i.e., need not have the "double" construction, so that the cage 1 can be simple and lightweight, and a load applied to the cable 3 can be reduced.

Figure 6:
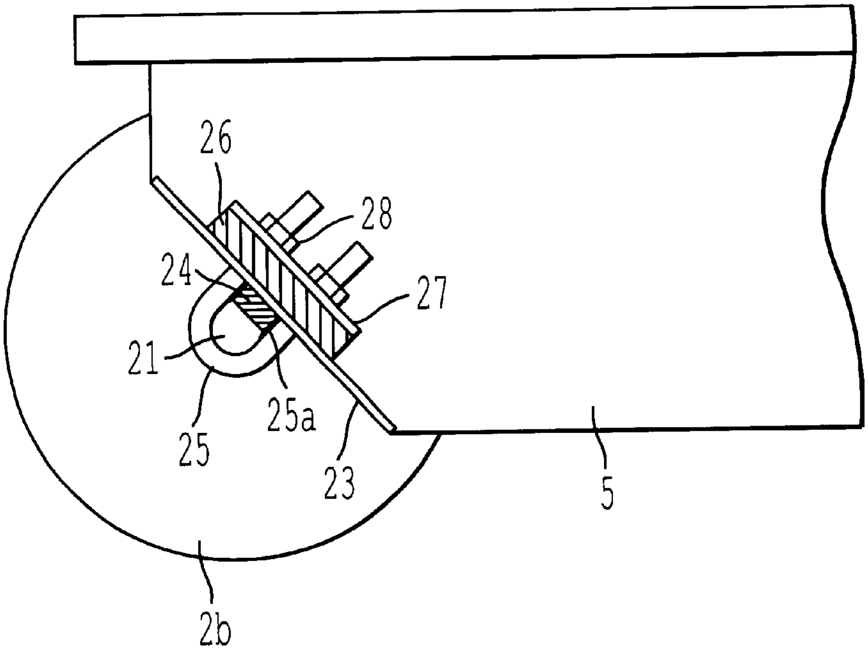
FIG. 6 is a side view of the car sheave 2*b* showing a second embodiment of the present invention.

FIG. 6 is a side view of the car sheave 2*b* showing a second embodiment of the present invention, in which the edge of the support base 5 supporting the axle 21 of the car sheave 2*b* is enlarged.

Since the second embodiment modifies a part of the elevator of the first embodiment of the present invention, in the following description, only components different from the components explained in the first embodiment are described.

As shown in FIG. 6, one corner of the support base 5 is bent to form a slant plate 23 slanting 45° off the horizontal plane. That is, the slant plate 23 is slanted to be perpendicular to a resultant force of a tension F1 and a tension F2 of the cable 3 shown in FIG. 3. The axle 21 of the car sheave 2*b* is secured to the slant plate 23 by a U-shaped bolt 25 through an elastic member such as a rubber element 24. The axle has a support plane 25*a* which faces the rubber element 24. A rubber plate 26 lies on the other side of the slant plate 23, and is secured with the U-shaped bolt 25 and nuts 28 through a plate 27. Further, the slant plate 23 has holes (not shown) pierced by the U-shaped bolt 25, and the holes are big enough so that the U-shaped bolt 25 does not contact the slant plate 23.

Although only the structure of one corner of the support base 5 is shown in FIG. 6 for the sake of convenience, the other corner of the support base 5 has the same structure shown in FIG. 6.

According to the second embodiment, vibration and noise caused by a contact point between the cable 3 and the car sheaves 2*a* and 2*b* are attenuated by the rubber element 24 and the rubber plate 26. The attenuated vibration is then transferred to the support base 5, and finally transferred to the cage 1 through the rubber plates 7*a* and 7*b*. Thus, the comfort of a ride in the cage 1 can be improved.

Moreover, since the slant plate 23 is slanted 45° off a horizontal plane so that the rubber element 24 and the rubber plate 26 can receive only compressive forces from the cable 3, an anti-vibration effect can be achieved efficiently. That is because rubber plates can attenuate vibration in the compressive direction efficiently, but are not competent to attenuate vibration in the shearing direction.

Furthermore, since the rubber element 24 and the rubber plate 26 are disposed on both sides of the slant plate 23, in case the car sheaves 2*a* and 2*b* move either in the going away direction from the slant plate 23 or in the direction of going toward to the slant plate 23, a compressive force can be received by either the rubber element 24 or the rubber plate 26.

Furthermore, the support base 5 can be secured to the base 11 without the rubber plates 7*a* and 7*b*, although the support base 5 is secured to the base 11 through the rubber plates 7*a* and 7*b* in the second embodiment. In this case, a deformation sensor might be installed to detect the deformation of the rubber plate 2*b* in order to calculate a load of the cage 1.

Figure 7:
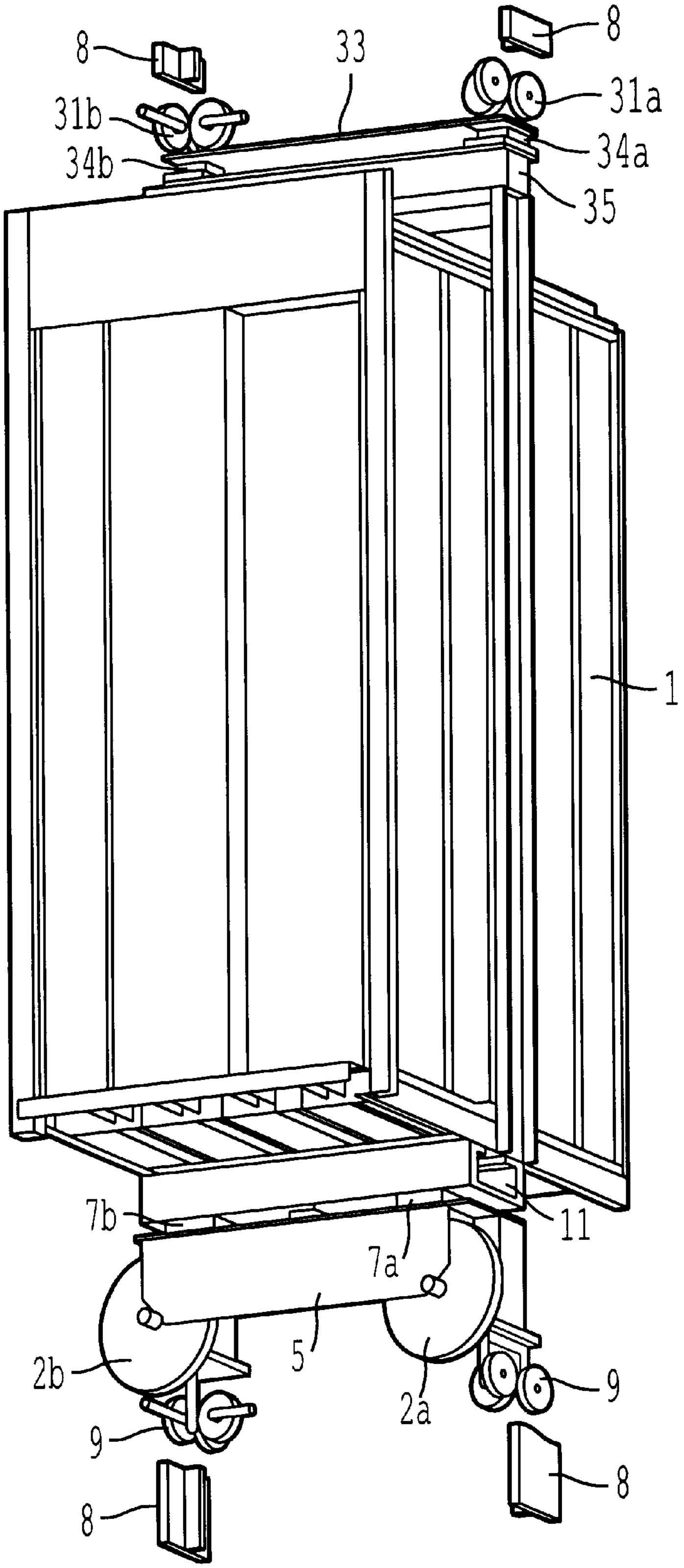
FIG. 7 is a perspective view of an elevator cage of a third embodiment of the present invention.

FIG. 7 is a perspective view of an elevator of a third embodiment of the present invention. Since the third embodiment includes components added to the first embodiment, in the following description, only components different from the components explained in the first embodiment are described.

As shown in FIG. 7, upper roller guides 31*a* and 31*b* are secured on opposite edges of a support beam 33 attached on a crosshead 35 of the cage 1 through rubber plates 34*a* and 34*b*.

According to the third embodiment, since vibration caused by unevenness of guide rails 8 and transferred from the upper roller guides 31*a* and 31*b* can be attenuated by the rubber plates 34*a* and 34*b,* the comfort of a ride in the cage 1 can be improved.

Further, since both upper roller guides 31*a* and 31*b* are secured to the support beam 33, the upper roller guides 31*a* and 31*b* can be supported firmly against a force pushing down the upper roller guides 31*a* and 31*b* and can obtain a high reliability.

Figure 8:
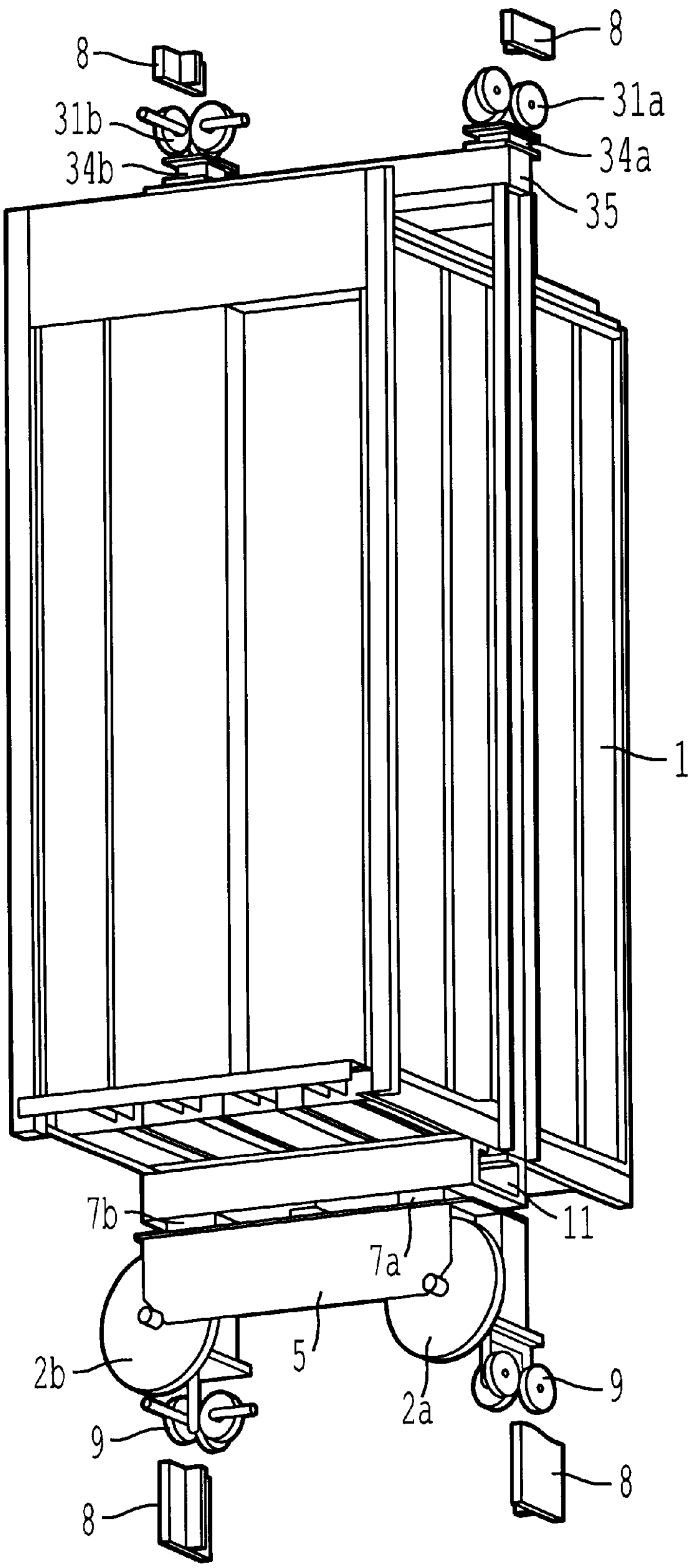
FIG. 8 is a perspective view of an elevator cage of a third embodiment of the present invention.

If the rubber plates 34*a* and 34*b* are strong enough, as shown in FIG. 8, the upper roller guides 31*a* and 31*b* can be directly attached to the crosshead 35 without the support beam 33.

Figure 9:
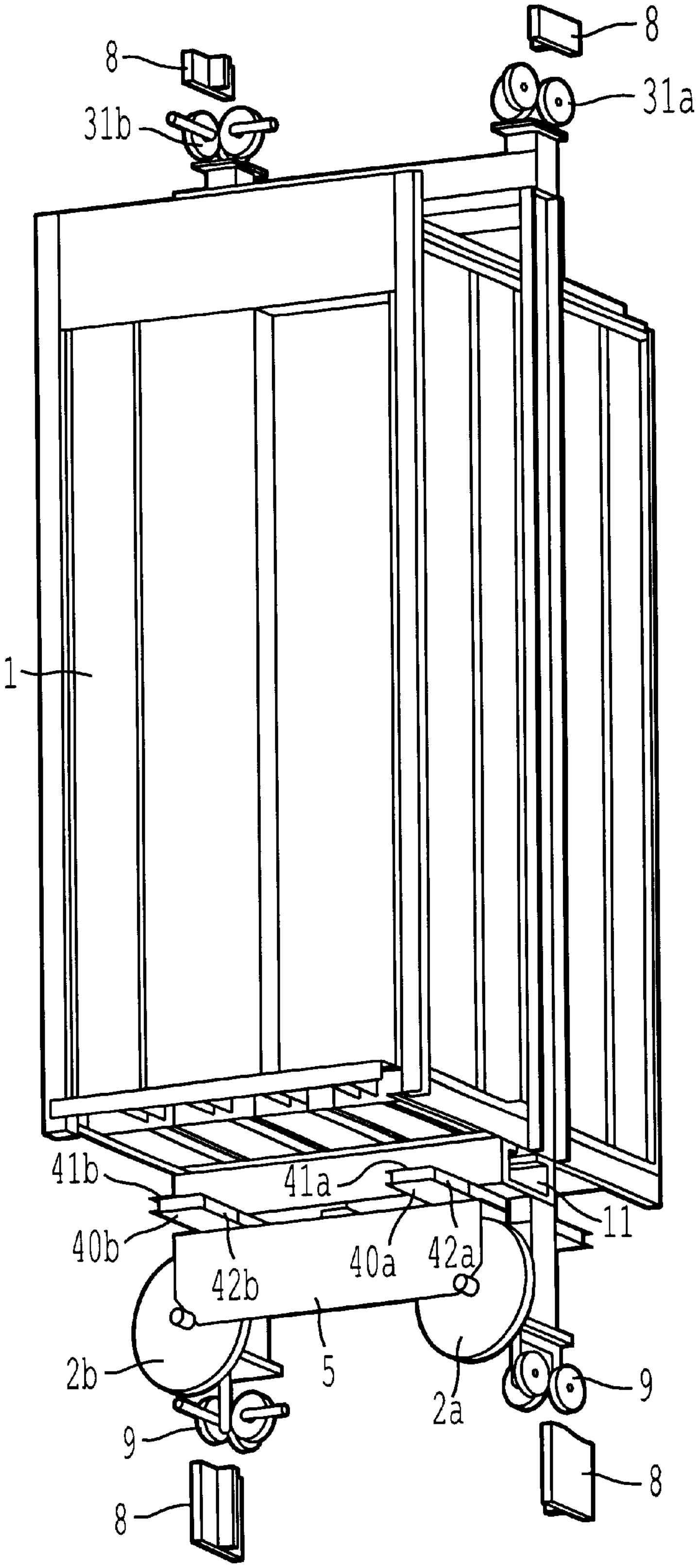
FIG. 9 is a perspective view of an elevator cage of a fourth embodiment of the present invention.
Figure 10:
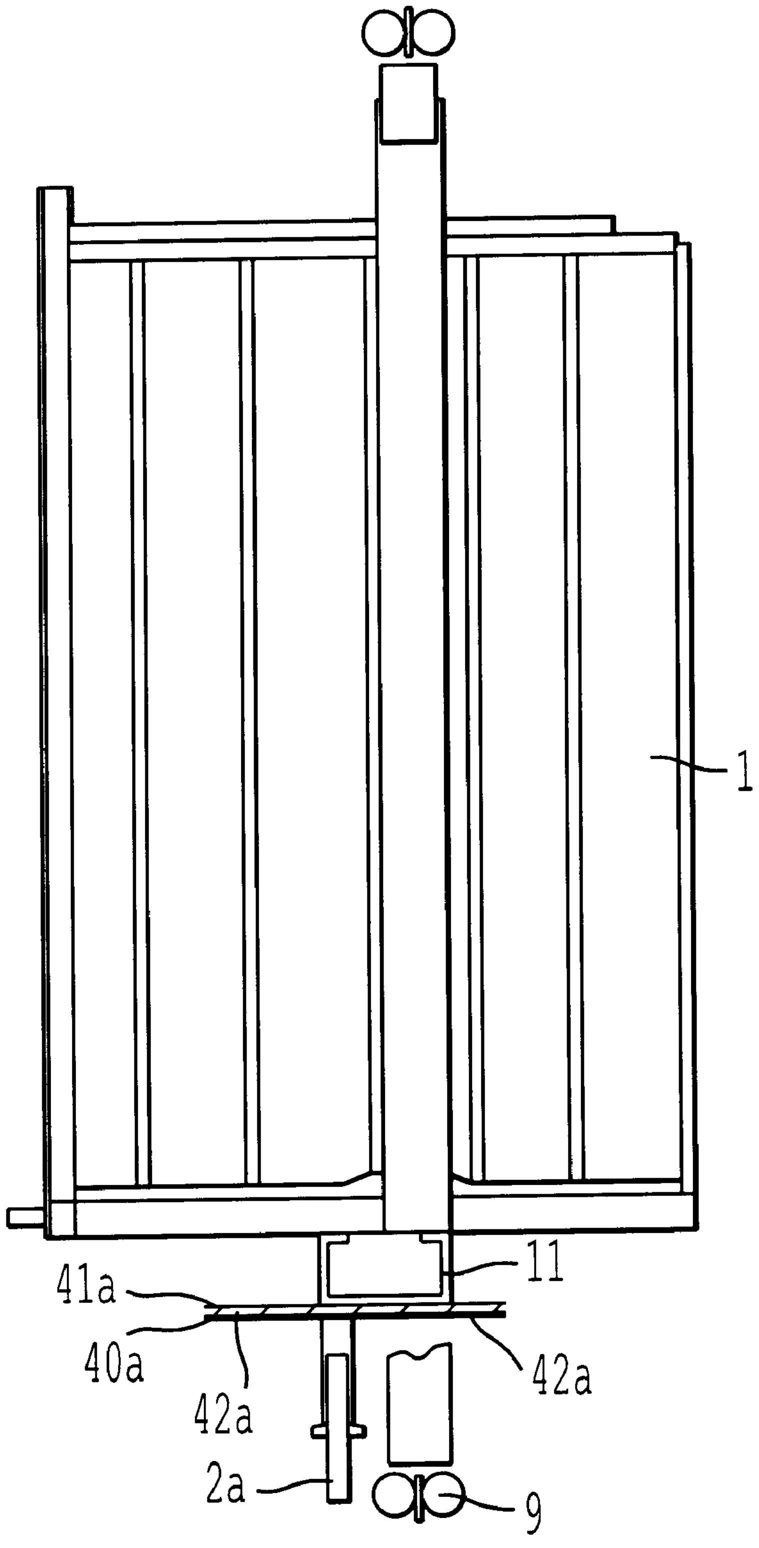
FIG. 10 is a side view of the elevator in FIG. 9.

FIG. 9 is a perspective view of an elevator of a fourth embodiment of the present invention. FIG. 10 is a side view of the elevator in FIG. 9.

In the following description, only components different from the components explained in the first embodiment shown in FIGS. 3–5 are described.

As shown in FIG. 9 and FIG. 10, two support plates 41*a* and 41*b* extending in the depth direction of the cage 1 are attached to a lower side of the base 11, and two support plates 40*a* and 40*b* extending in the depth direction of the cage 1 are attached to a upper side of the support base 5. Rubber plates 42*a* and 42*b* are positioned to both ends of the support plates 40*a* and 40*b,* and are disposed between the support plates 41*a* and 41*b,* and the support plates 40*a* and 40*b*.

According to the fourth embodiment, since the rubber plates 42*a* and 42*b* are positioned at both ends of the support plates 40*a,* 40*b,* 41*a* and 41*b* extending in the depth direction of the cage 1, the cage 1 can be supported firmly against a force pushing down the cage 1 in the depth direction of the cage 1 (i.e., the direction extending from the front door to the back wall of the cage 1).

Figure 11:
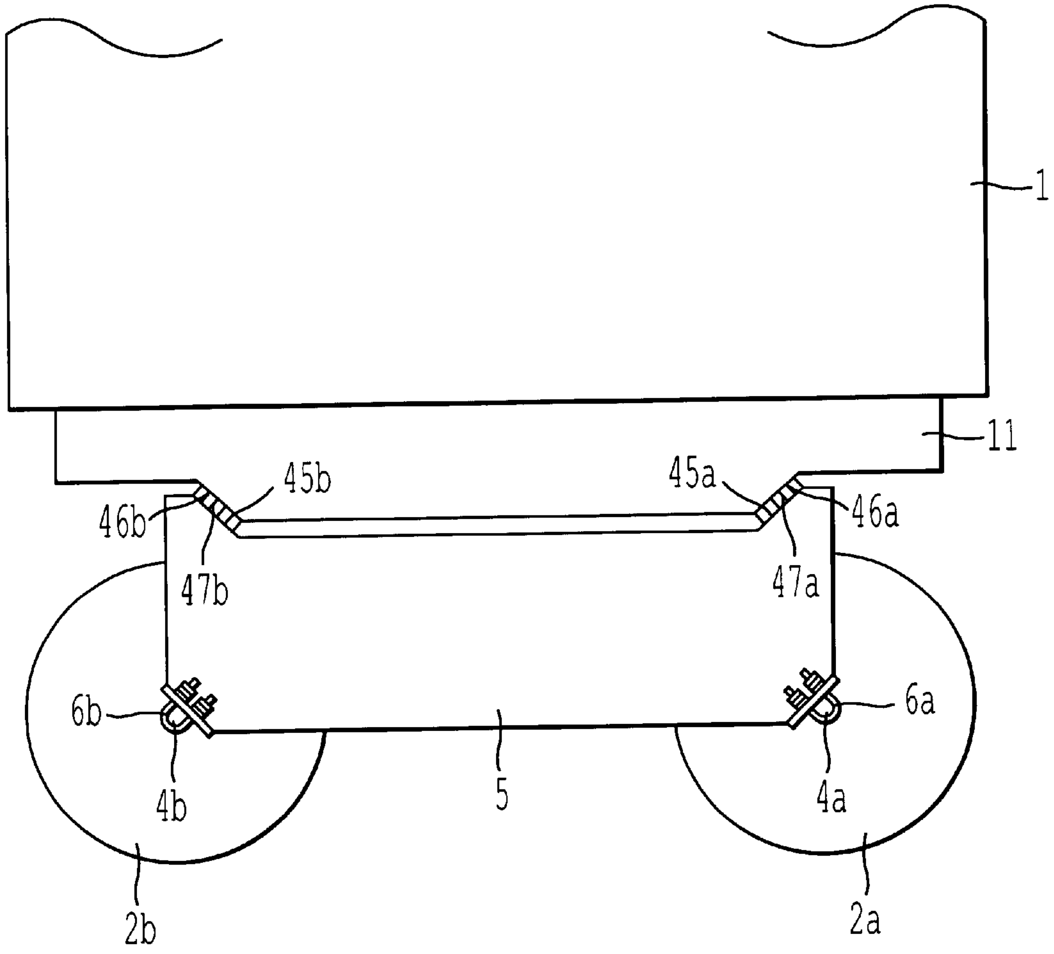
FIG. 11 is a partial side view of an elevator cage of a fifth embodiment of the present invention.

FIG. 11 is a partial side view of an elevator of a fifth embodiment of the present invention.

In the following description, only components different from the components explained in the first embodiment shown in FIGS. 3–5 are described.

As shown in FIG. 11, support planes 45*a* and 45*b* slanting 45° off the horizontal plane in the width direction of the cage 1 are formed at both lower edges of the base 11, and support planes 47*a* and 47*b* slanting 45° corresponding to the support planes 45*a* and 45*b* are formed at both upper edges of the support base 5. Rubber plates 46*a* and 46*b* are disposed between the support planes 45*a* and 45*b,* and the support planes 47*a* and 47*b* so that the pressed sides of the rubber plates 46*a* and 46*b* are inclined by 45° in the width direction of the cage 1.

According to the fifth embodiment, since the pressed side of the rubber plates 46*a* and 46*b* inclines by 45° in the width direction of the cage 1, in case the cage 1 is swayed in the width direction of the cage 1 and then vibration in the width direction of the cage 1 occurs, the vibration transferred to the cage 1 can be attenuated by the rubber plates 46*a* and 46*b*. In other words, since the pressed side of the rubber plates 46*a* and 46*b* inclines by 45° in the width direction of the cage 1, the rubber plates 46*a* and 46*b* can attenuate either vibration in the vertical direction or vibration in the width direction of the cage 1.

Furthermore, the pressed sides of the rubber plates 46*a* and 46*b* need not be inclined only by 45°. In fact, the angle of inclination depends on what kind of vibration is expected during travel of the cage 1 or how big the vibration is.

Figure 12:
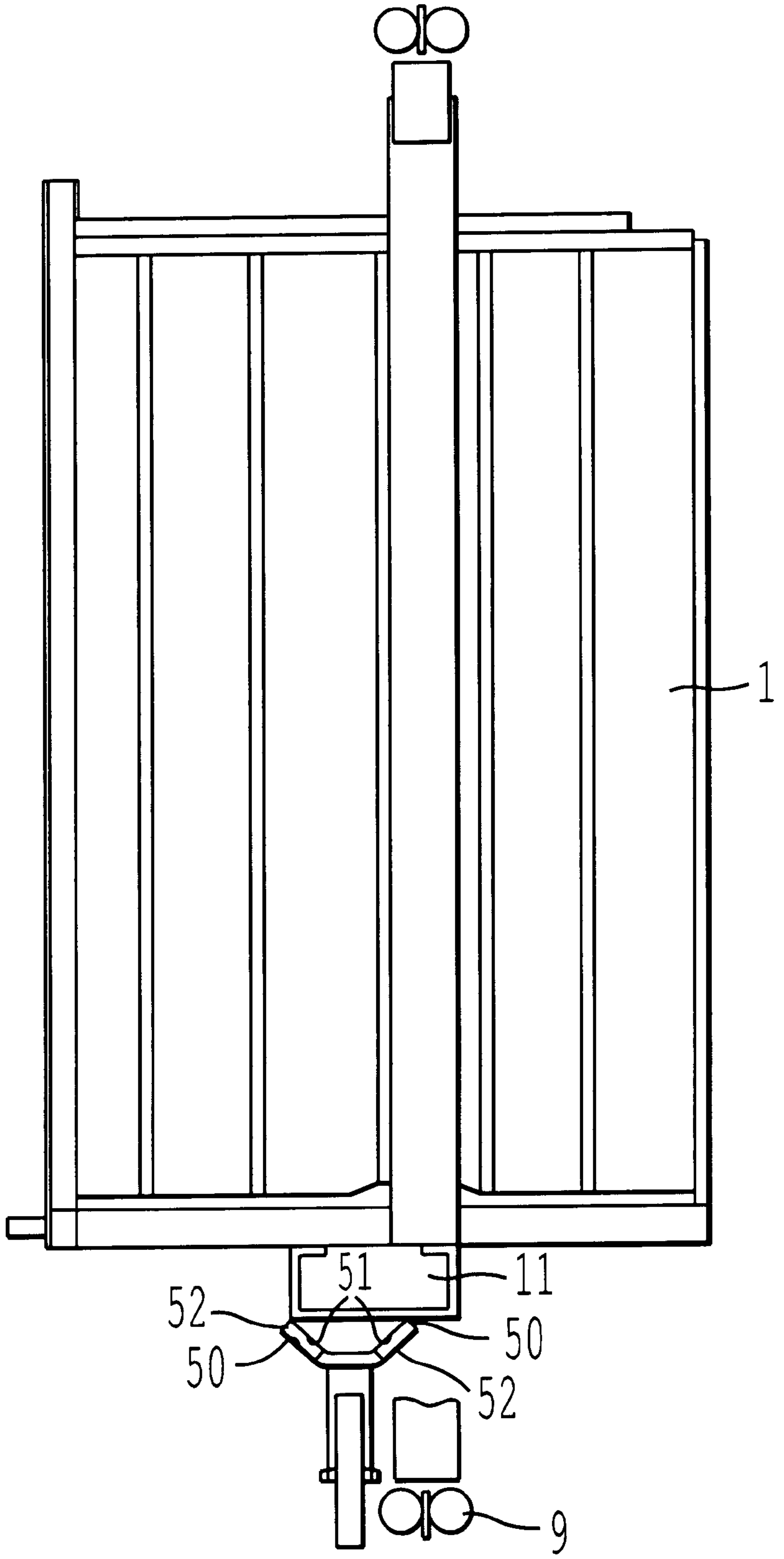
FIG. 12 is a side view of an elevator cage of a sixth embodiment of the present invention.

FIG. 12 is a side view of an elevator cage of a sixth embodiment of the present invention.

In the following description, only components different from the components explained in the first embodiment shown in FIGS. 3–5 are described.

As shown in FIG. 12, support planes 51 slanting 45° off the horizontal plane in the depth direction of the cage 1 are formed at the lower side of the base 11, and support planes 50 slanting 45° corresponding to the support planes 51 are formed at the upper side of the support base 5. Rubber plates 52 are disposed between the support planes 51 and the support planes 50 so that the pressed sides of the rubber plates 52 incline by 45° in the depth direction of the cage 1.

According to the sixth embodiment, since the pressed side of the rubber plates 52 incline by 45° in the depth direction of the cage 1, in case the cage 1 is swayed in the depth direction of the cage 1 and then vibration in the depth direction of the cage 1 occurs, the vibration transferred to the cage 1 can be attenuated by the rubber plates 52. In other words, since the pressed sides of the rubber plates 52 incline by 45° in the depth direction of the cage 1, the rubber plates 52 can attenuate either vibration in the vertical direction or vibration in the depth direction of the cage 1.

Furthermore, the pressed sides of the rubber plates 52 need not be inclined by only 45°. It depends on what kind of vibration is expected during travel of the cage 1 or how big the vibration is.

Figure 13:
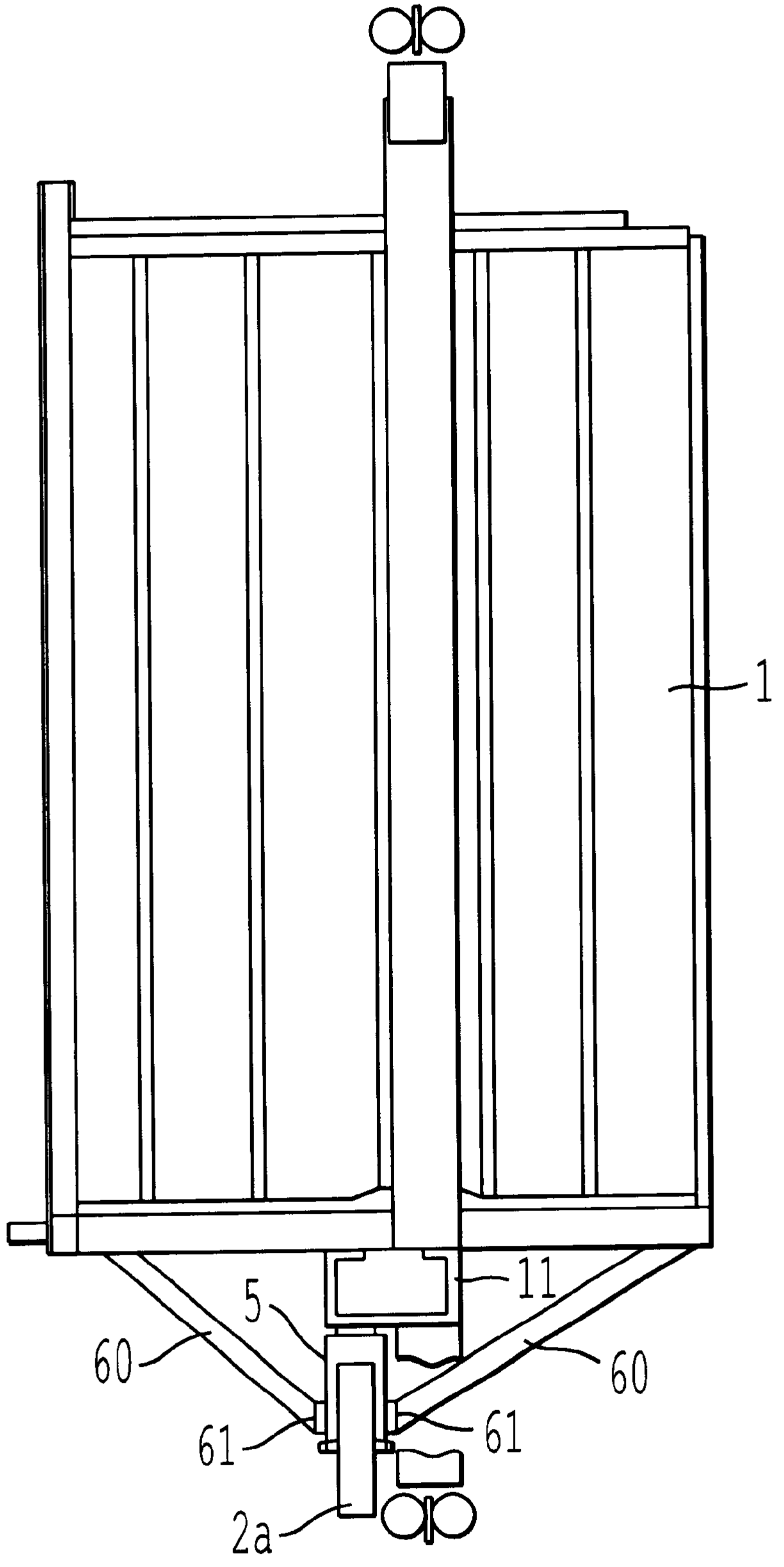
FIG. 13 is a side view of an elevator cage of a seventh embodiment of the present invention.

FIG. 13 is a side view of an elevator of a seventh embodiment of the present invention.

In the following description, only components different from the components explained in the first embodiment shown in FIGS. 3–5 are described.

As shown in FIG. 13, one end of each of support bars 60 is secured to a lower side of the cage 1, and the other end of each of support bars 60 is secured to respective sides of the support base 5 through elastic members 61 made of rubber, for example.

According to the seventh embodiment, since both sides of the support base 5 are secured to the support bars 60, the support base 5 can be supported firmly against a force pushing down the support base 5 in the depth direction of the cage 1. Further, vibration transferred from the support bars 60 is attenuated by the elastic members 61.

Various modifications and variations are possible in light of the above teachings. Therefore, within the scope of the appended claims, the present invention may be practiced otherwise than as specifically described herein.

What is claimed as new and desired to be secured by Letters Patent of the United States is:

1. An elevator comprising:

a cage for accommodating passengers and having a front and rear defining a depth direction between the front and the rear, opposed sides defining a width direction between the opposed sides, and a bottom and a top defining a vertical direction between the bottom and the top;

a first support plate extending in the width direction of said cage, and attached to a lower portion of said cage;

a second support plate coupled to a bottom portion of the first support plate;

a base extending in the width direction of said cage and supported by the second support plate;

a plurality of car sheaves installed at the base;

a cable placed around said car sheaves and configured to suspend said cage;

a hoisting machine having a traction sheave configured to drive said cable;

a plurality of lower guides attached to the second support plate and configured to move up and down in a shaft along a guide rail with the plurality of guides in engagement with the guide rail;

a top support beam secured to the upper portion of said cage;

a plurality of upper guides attached to the top support beam and configured to move up and down in a shaft along a guide rail with the plurality of guides in engagement with the guide rail; and a first elastic member lying between said first and second support plates.

2. The elevator as recited in claim 1, comprising:

a plurality of second elastic members secured between said car sheaves and said base.

3. The elevator as recited in claim 1, comprising:

a second elastic member interposed between said first and second support plates.

4. The elevator as recited in claim 1, wherein:

said base comprises slant planes at opposite edges of said second support base, and said car sheaves comprise axles secured to said slant planes.

5. The elevator as recited in claim 1, further comprising:

a deformation sensor installed between said first support base and said first support plate so as to detect a load of said cage.

6. The elevator as recited in claim 1, further comprising:

a further elastic member disposed between said cage and said top support beam.

7. An elevator comprising:

a cage for accommodating passengers and having a front and rear defining a depth direction between the front and the rear, opposed sides defining a width direction between the opposed sides, and a bottom and a top defining a vertical direction between the bottom and the top;

a support plate extending in the width direction of said cage, and attached to a lower portion of said cage;

a base extending in the width direction of said cage and supported by the support plate;

a plurality of car sheaves installed at the base;

a cable placed around said car sheaves and configured to suspend said cage;

a hoisting machine having a traction sheave configured to drive said cable;

a plurality of lower guides attached to the support plate and configured to move up and down in a shaft along a guide rail with the plurality of guides in engagement with the guide rail;

a top support beam secured to the upper portion of said cage;

a plurality of upper guides attached to the top support beam and configured to move up and down in a shaft along a guide rail with the plurality of guides in engagement with the guide rail; and a first elastic member lying between said support plate and the base;

wherein said first elastic member comprises a rubber plate having a side pressed between said support plate and said base and arranged at an angle with respect to the horizontal plane.

8. The elevator as recited in claim 7, wherein:

said pressed side is arranged at said angle in the width direction of said cage.

9. The elevator as recited in claim 7, wherein:

said pressed side is arranged at said angle in the depth direction of said cage.

* * * * *